United States Patent
Fague et al.

(10) Patent No.: US 7,200,188 B2
(45) Date of Patent: Apr. 3, 2007

(54) METHOD AND APPARATUS FOR FREQUENCY OFFSET COMPENSATION

(75) Inventors: Daniel E. Fague, Andover, MA (US); Thomas J. Liptay, Cambridge, MA (US); Colm J. Prendergast, Cambridge, MA (US); Edmund J. Balboni, Littleton, MA (US)

(73) Assignee: Analog Devices, Inc., Norwood, MA (US)

( * ) Notice: Subject to any disclaimer, the term of this patent is extended or adjusted under 35 U.S.C. 154(b) by 737 days.

(21) Appl. No.: 10/353,103

(22) Filed: Jan. 27, 2003

(65) Prior Publication Data

US 2004/0146122 A1    Jul. 29, 2004

(51) Int. Cl.
*H04L 27/06* (2006.01)
(52) U.S. Cl. ........................ 375/326; 375/344
(58) Field of Classification Search ........... 375/322, 375/324, 326, 344
See application file for complete search history.

(56) References Cited

U.S. PATENT DOCUMENTS

| | | | | |
|---|---|---|---|---|
| 5,228,062 A | * | 7/1993 | Bingham | 375/344 |
| 5,444,415 A | | 8/1995 | Dent et al. | 329/302 |
| 6,275,551 B1 | * | 8/2001 | Nomura et al. | 375/365 |
| 6,603,820 B1 | * | 8/2003 | De Mey et al. | 375/322 |
| 6,642,797 B1 | * | 11/2003 | Luo et al. | 331/1 R |
| 2004/0114697 A1 | * | 6/2004 | Young | 375/350 |

FOREIGN PATENT DOCUMENTS

| | | |
|---|---|---|
| EP | 1220504 A1 | 7/2002 |
| GB | 2374767 A | 10/2002 |
| WO | WO 0041373 | 7/2000 |

OTHER PUBLICATIONS

National Semiconductor Application Note No. 908., "Specification for the DECT Ari 1™ Interface to the Radio Frequency Front End", Sep. 1993.
"Switched DC Offset Compensation and LO Tuning for Frequency Offset for FM Discriminators for Bluetooth", Presentation by Parthus, May 2, 2001.

* cited by examiner

*Primary Examiner*—Jay K. Patel
*Assistant Examiner*—David B. Lugo
(74) *Attorney, Agent, or Firm*—Koppel, Patrick, Heybl & Dawson

(57) ABSTRACT

Frequency offsets between a received carrier signal and a receiver's LO frequency are compensated by determining the offset and adjusting the phase of a demodulated signal derived from the modulated carrier. For frequency offsets that produce DC voltage offsets in I and Q components of the demodulated signal, the phase correction is implemented by operating upon the I and Q components with phase rotation operators in the form of $\sin\theta$ and $\cos\theta$, where $\theta$ is an angle whose tangent is the result of dividing the Q by the I frequency offsets.

37 Claims, 3 Drawing Sheets

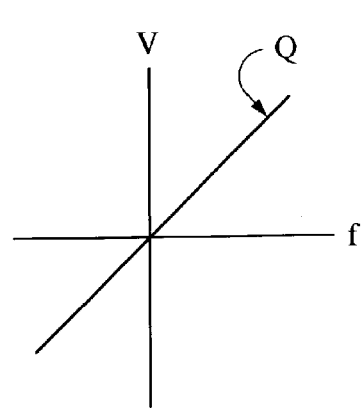
Fig. 5
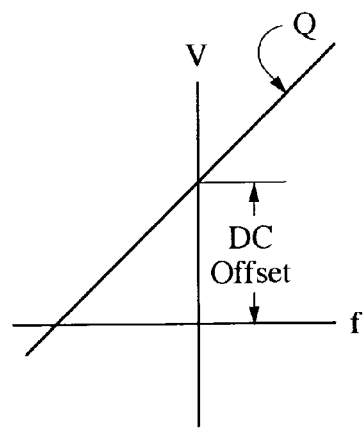
Fig. 6
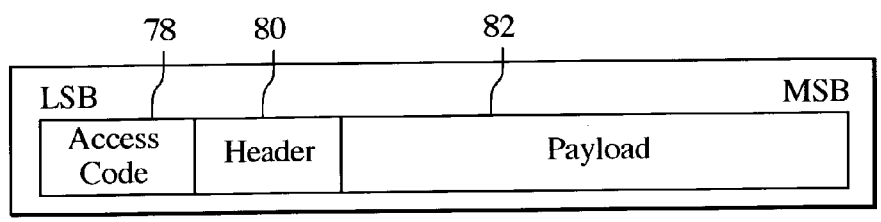
Fig. 7a
(Prior Art)
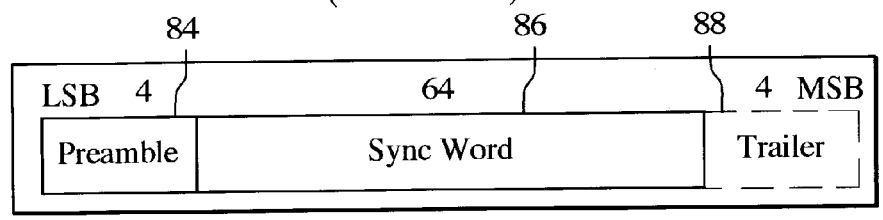
Fig. 7b
(Prior Art)
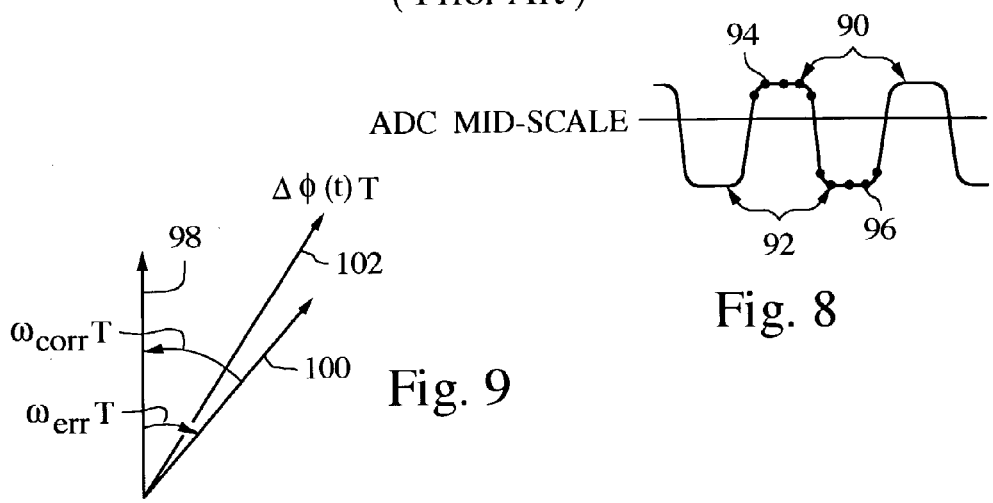
Fig. 8
Fig. 9

METHOD AND APPARATUS FOR FREQUENCY OFFSET COMPENSATION

BACKGROUND OF THE INVENTION

1. Field of the Invention

This invention relates to the compensation of frequency offsets between a modulated carrier signal and a local oscillator signal, and more particularly to frequency offset compensation which is effected by adjusting the demodulated signal phase.

2. Description of the Related Art

The present invention has particular application to the Bluetooth™ wireless technology data communication system, although it is not limited to this technology. The Bluetooth specification, established by the Bluetooth SIG, Inc., integrates well-tested technology with the power-efficiency and low-cost of a compliant radio system to enable links between mobile computers, mobile phones, portable hand-held devices and the like, and connectivity to the Internet.

Part of the Bluetooth physical layer specification calls for binary frequency shift keying (FSK) with a modulation index of 0.28–0.35 to be used as the modulation method, the term "modulation index" being defined as the peak-to-peak frequency deviation in the modulation signal divided by the modulation's data rate. The modulation data rate for the Bluetooth wireless technology is 1 Mb/sec, which yields an allowable peak-to-peak frequency deviation of 280–350 kHz. The Bluetooth specification also allows for the transmitter's frequency to be accurate to within +/−75 kHz, thus permitting a maximum possible frequency offset (FO) between the transmitted carrier frequency and the receiver's local oscillator (LO) frequency as high as 150 kHz. This is larger than the minimum peak frequency deviation of 140 kHz (half the peak-to-peak frequency deviation). Without compensation for this error, the receiver can detect the incoming data 1 and 0 bits as all ones, or all zeros. This would effectively generate a 50% bit error rate (BER), as opposed to the 0.1% BER Bluetooth sensitivity specification.

A prior frequency offset compensation technique in the form of DC offset compensation for FM discriminators is described in National Semiconductor Application Note No. 908, "Specification For The DECT Ari 1™ Interface To The Radio Frequency Front End", September 1993. This circuit seeks to recover the mean DC level of the input demodulated data signal, based upon a filtered version of the input data stream. The accuracy of the DC recovery depends upon the DC content of the incoming data (which is zero in the case of the preamble for a non-offset Bluetooth technology data packet), and also upon the time constant of an RC filter used in the circuit. The longer the time constant, the more data bits must be received before (the correct DC value is achieved. Once the DC value has been acquired it is held on a capacitor, removing any further dependence upon the DC content of the incoming data. This circuit has proven effective in a system in which the incoming preamble had 32 bits with zero DC content. With the Bluetooth wireless technology, however, the preamble is only 4 or 5 bits long, which can lead to errors with this approach. With such a short time constant, the circuit would significantly degrade the receiver's performance by having too great a dependence upon the incoming data's most recent value.

An improved version of the DC offset compensation scheme is disclosed in "Switched DC Offset Compensation And LO Tuning For Frequency Offset For FM Discriminators For Bluetooth", presentation by Parthus, 2 May 2001. In this technique, as with the Application Note just described, a DC voltage level varies in accordance with the amount of FO. However, the DC loop has a switched bandwidth which automatically changes based upon the difference between a new average DC value and the existing DC value. The loop also provides for compensating the FO by tuning the receiver's LO to narrow the FO between the received signal and the LO. While this reduces the amount of DC offset at the demodulator output, the system is best used with a frequency discriminator in which the FO directly translates to DC offset.

SUMMARY OF THE INVENTION

The present invention provides an improved apparatus and method for compensating FOs between the carrier and LO frequencies, and is based upon adjusting the phase of a demodulated signal derived from the received RF signal.

In one embodiment, the FO is determined by comparing the down converted and demodulated signal to a reference signal level which is based upon a frequency characteristic of a received data packet's preamble, which in this case is an FSK characteristic. Equal numbers of samples of the demodulated signal are accumulated for both of the FSK modulation frequencies during the preamble, and compared with a reference signal level which corresponds to an intermediate frequency between nominal values for the FSK frequencies, preferably the mid-range value. Non-zero FOs result in an output level which varies with the difference between the reference signal level and the average value of the samples, which in turn represent the FO.

One embodiment of an FO compensation circuit provides phase rotation operators which correspond to different values of the FO, as determined by the FO determination circuit. The phase rotation operators are applied to the demodulated signal to adjust its phase in a manner that compensates for the FO. This is preferably accomplished with separate phase rotation operators for the in-phase (I) and quadrature (Q) components of the demodulated signal in the form of $\sin(\phi)$ and $\cos(\phi)$, respectively, where $\phi=\tan^{-1}(FOQ/FOI)$, and FOI and FOQ correspond to the FOs associated with the I and Q components, respectively. The I and Q components are multiplied by $\sin(\phi)$ and $\cos(\phi)$, respectively, in a complex multiplier, with the results combined to yield an FO compensated output signal.

Rather than having to establish a continuous loop and repeatedly update the compensation, an entire received data packet can be compensated with this technique based upon the compensation provided from the packet's preamble. The compensation is preferably performed digitally, and the phase rotation operators can be pre-stored in a lookup table at fixed FO steps. The result of the complex multiplication is a compensated imaginary output which can then be used for data recovery.

These and other features and advantages of the invention will be apparent to those skilled in the art from the following detailed description, taken together with the accompanying drawings.

BRIEF DESCRIPTION OF THE DRAWINGS

FIGS. 5 and 6 are small signal graphs of the Q signal component for zero and non-zero FOs, respectively;

FIGS. 7a and 7b are diagrams illustrating the standard data packet format and its access code format, respectively, used in a Bluetooth wireless technology data packet.

FIG. 8 is a waveform diagram of a demodulated data packet preamble, illustrating a sampling of waveforms such as those shown in FIG. 4, which is performed by the FO compensation circuit of FIG. 3 to determine DC offset as an indication of FO; and FIG. 9 is a phase diagram illustrating an FO phase correction performed with the invention.

DETAILED DESCRIPTION

The present invention deals with the compensation of FOs between a received carrier signal and an LO signal used to demodulate the information borne by the carrier. While it is particularly useful in meeting the Bluetooth specification, it is applicable to RF receivers in general.

Figure 1:
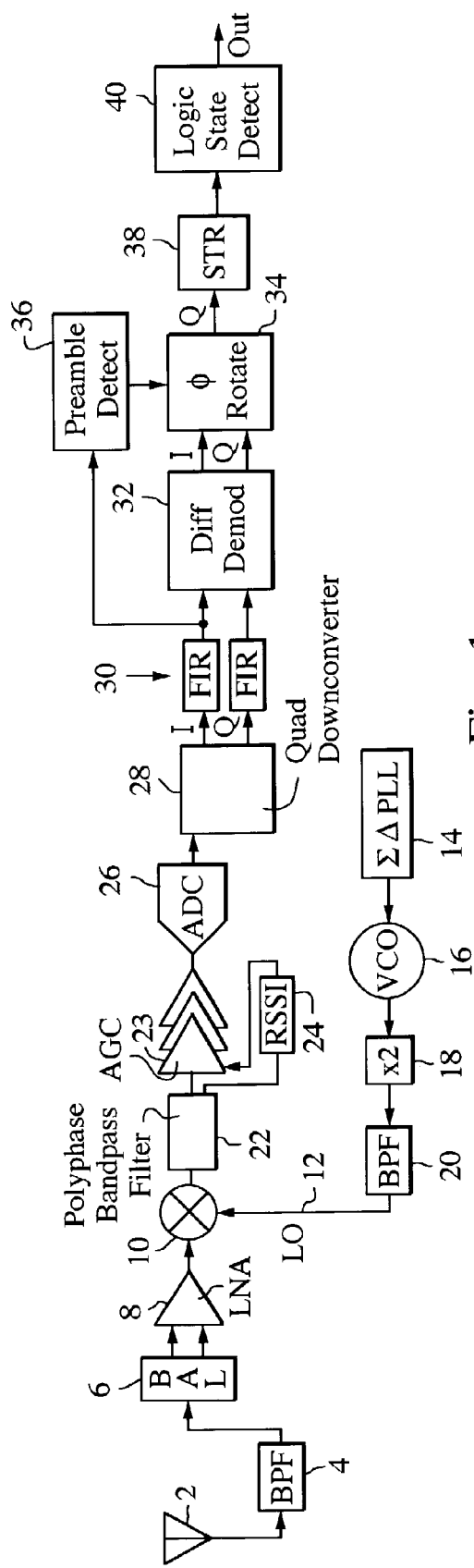
FIG. 1 is a block diagram of a Bluetooth wireless technology receiver system incorporating one embodiment of the invention.

A representative RF receiver with which the invention can be used is illustrated in FIG. 1. The received signal, consisting of a carrier modulated by an information signal, is delivered by an antenna 2 to a bandpass filter 4, which restricts the signal to a desired band around the carrier frequency. The single-ended output of filter 4 is converted by a balun circuit 6 to a differential signal that is processed by a low noise amplifier 8. ("Balun" is an acronym for "balanced-unbalanced", referring to the single-ended to differential conversion.) The LNA 8 preferably amplifies the signal with about 22 dB of gain. The signal is then input to a mixer 10, where it is downconverted to a low intermediate frequency (IF) of typically 2.5 MHz by mixing with an LO signal on the other mixer input 12; the IF is the difference between the carrier and LO frequencies. The mixer's gain is approximately 10 dB in this embodiment. It may also be possible to downconvert the signal directly to baseband at this point.

A preferred LO generation circuit comprises a sigma-delta phase locked loop 14, the output of which controls a voltage controlled oscillator (VCO) 16. The VCO output in turn is multiplied by two in multiplier 18 and processed through a bandpass filter 20 to produce the desired LO signal on mixer input 12. A relatively low IF is chosen so that the signal can be digitized and demodulated digitally with a reasonable current budget.

After downconversion, the signal is filtered by a complex polyphase bandpass filter 22, which attenuates all out-of-band and adjacent channels to at least 6 dB below the desired signal level, and then to a programmable gain amplifier 23 which provides automatic gain control; its gain is set based upon a received signal strength indicator (RSSI) circuit 24. The RSSI circuit ensures a constant signal level at the input of an analog-to-digital converter (ADC) 26 that converts the signal to a digital format. The ADC preferably has 8-bit resolution to provide sufficient dynamic range for both interference margin and signal-to-noise ratio for proper demodulation. It is preferably digitized at 10 Msps.

The digitized output of ADC 26 is downconverted to baseband by a quadrature downconverter 28, which can have the option of a 180° phase shift to invert the spectrum for the case of a high side LO downconversion from the RF. The quadrature downconverter outputs have in-phase I (real) and quadrature Q (imaginary) components. They are sent to a pair of finite impulse response (FIR) low pass filters 30 which provide additional filtering of adjacent channels and also decimate by two, so that the output sample rate is 5 Msps.

The FIR filter outputs are delivered to a differential demodulator 32, which performs a complex differential detection by multiplying the received data stream by a one symbol (bit) delayed, complex conjugate version of itself. The mixer 10, quadrature downconverter 28 and differential demodulator 32, together with the intervening receiver elements, collectively form an extraction circuit that derives a demodulated signal from the received RF signal, based upon the LO signal.

The I and Q outputs of the demodulator 32 are delivered to a phase rotator 34, which compensates for FOs between the carrier and LO signals by rotating the phase of the demodulated signal, as explained in detail below. The I output of the FIR filters 30 is also delivered to a preamble detection circuit 36, which detects the preamble of a downconverted data packet. This information is used to actuate the phase rotation process.

The FO-compensated output of the phase rotator 34 is delivered to a symbol timing recovery (STR) circuit 38, where the received data's clock is recovered. The output of the phase rotator is also sent to a delay block (not shown) to synchronize the received signal with the STR circuit's output.

The output of the STR circuit 38 is delivered to a logic state detect block 40, which determines whether the received data is a "1" or a "0" by detecting whether it is above or below a predetermined threshold level. Block 40 includes a sample portion in the form of a register that is clocked by the recovered (and possibly delayed) clock from the STR circuit 38. The recovered clock signal samples the received data stream at its maximum amplitude, minimizing the effects of noise. The output of logic state detect block 40 is a "sliced" data bit stream at 1 Mb/s rate, which constitutes the receiver output.

Figure 2:
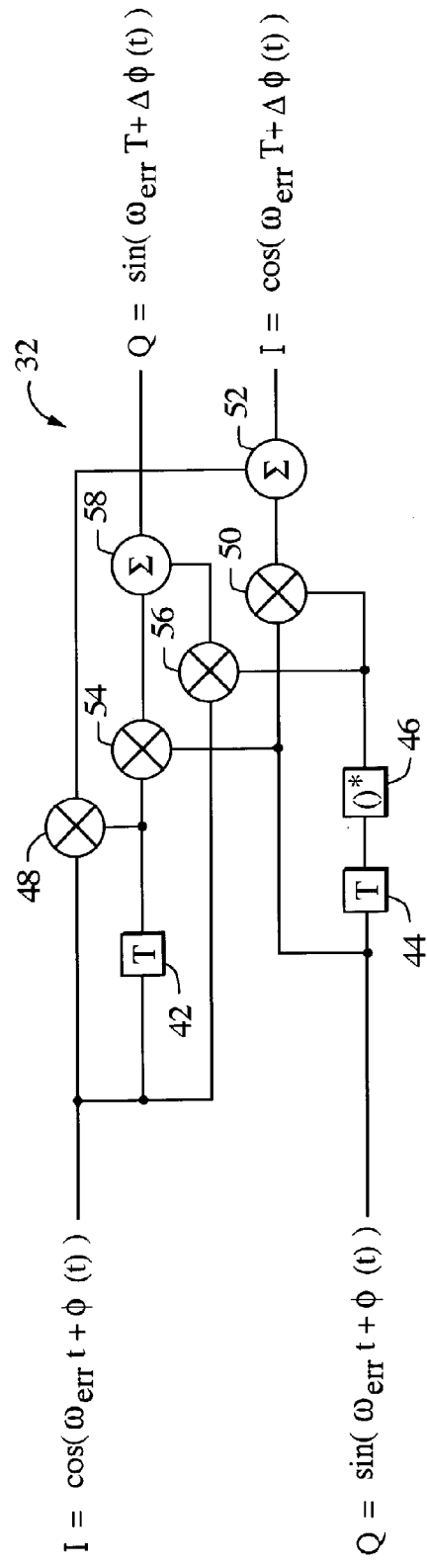
FIG. 2 is a block diagram of a differential demodulator employed in the digital demodulator section of the FIG. 1 receiver.

A block diagram of one implementation for the differential demodulator 32 is given in FIG. 2. The I and Q inputs to this circuit from the quadrature downconverter 28 and FIR filters 30 are in the form $\cos(\omega_{err}t+\phi(t))$ and $\sin(\omega_{err}t+\phi(t))$, respectively, where $\omega_{err}$ is the FO and $\phi(t)$ is the modulation signal. In the demodulator, single symbol time T delays 42 and 44 are introduced into secondary paths of the I and Q components, respectively. In addition, the delayed Q component is processed through a complex conjugator 46. The delayed I and Q signals are multiplied by their undelayed versions in multipliers 48 and 50, respectively, of a complex multiplier, and the results added in a summing circuit 52 to produce the demodulator I output in the form $\cos(\omega_{err}T+\Delta\phi(t))$, where $\Delta\phi(t)$ is the demodulated signal's phase change per data bit. The delayed I signal is also multiplied by the undelayed Q input in multiplier 54, while the delayed complex conjugated Q input is multiplied by the undelayed I input in multiplier 56, with the results of both multiplications combined in adder 58 to produce the demodulator's Q output in the form $\sin(\omega_{err}T+\Delta\phi(t))$.

It can be seen from the demodulator outputs that the FO manifests itself as a constant phase offset in the sine and cosine functions that varies in magnitude according to the size of the FO. For small FOs, this phase offset causes a DC offset in the received signal. As the FO increases, however, the demodulated signal begins to compress, which causes a reduction in the resulting signal-to-noise ratio and an increase in the bit error rate (BER). The signal amplitude also begins to decrease, causing a smaller decision distance for a given input power level, and hence increased bit errors.

Figure 3:
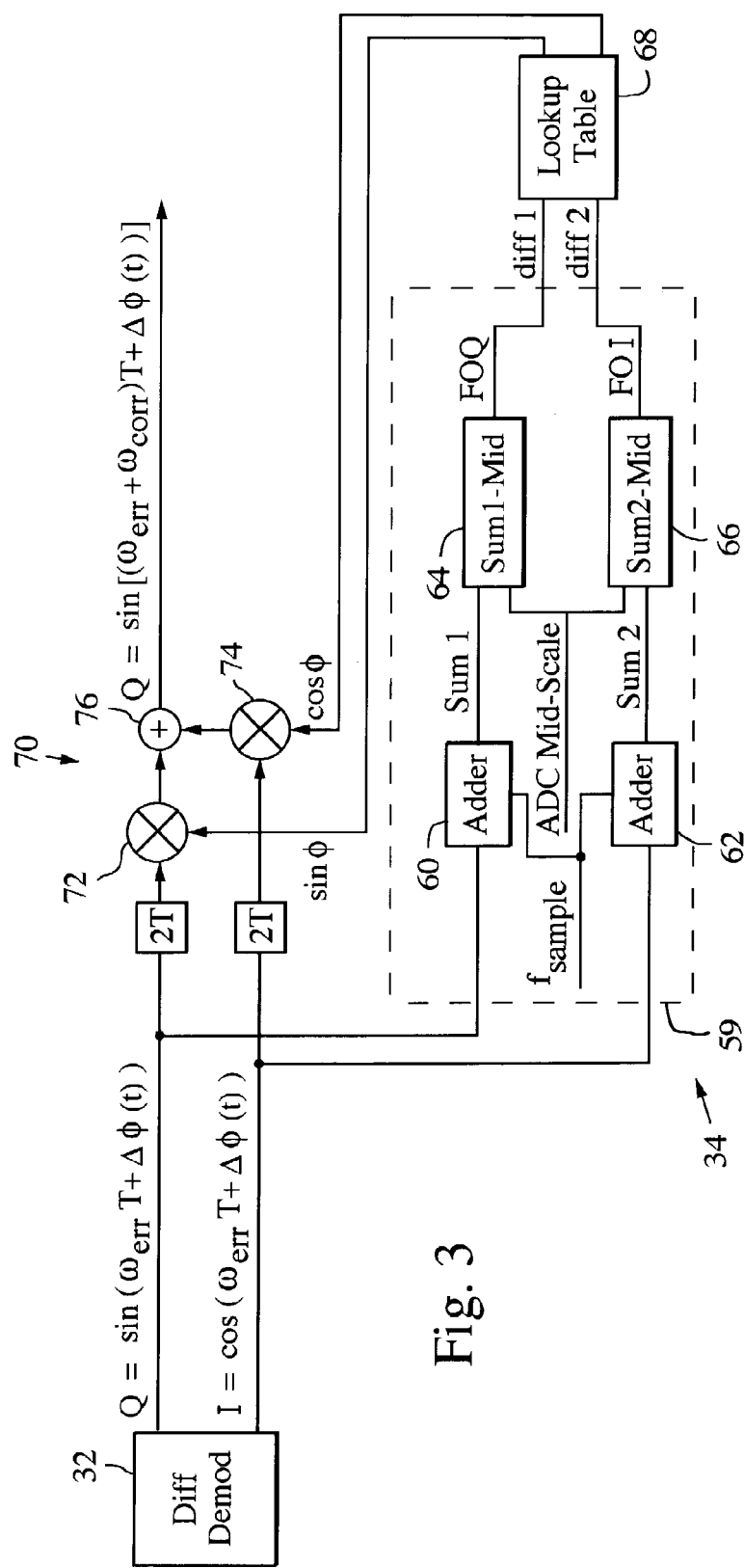
FIG. 3 is a block diagram of an FO compensation circuit that can be used in the receiver of FIG. 1.

As shown in FIG. 3, the phase rotator 34 which compensates for the FO includes an FO determination section 59 that produces an output which corresponds to the FO of the demodulated signal. This section has a pair of accumulator adders 60 and 62 which receive the Q and I outputs of the differential demodulator 32, respectively. Each adder is enabled by the preamble detect circuit 36 (shown in FIG. 1) detecting the preamble of a new data word to accumulate samples representing two consecutive preamble symbols (ten samples when the sample rate is five times the symbol frequency). For FSK modulation, each symbol is equal to one bit.

The sums produced by adders 60 and 62 are compared with the ADC mid-scale value (or with zero if mid-scale is removed from the sum) by comparators 64 and 66 for the demodulated Q and I components, respectively. The differences produced by the comparators represent the average DC offsets of the Q and I components, which in turn correspond to the Q and I FOs (hereinafter referred to as FOQ and FOI). Since the Q sine function will be zero for zero FO while the I cosine function will be at a maximum, the FO can be taken as a function of $\theta = \tan^{-1}(FOQ/FOI)$.

The Q comparator outputs are supplied to a lookup table 68 which stores phase rotation operators in the form $\sin \theta$ and $\cos \theta$. The entries in the lookup table correspond to the sine and cosine of specified FO increments, 40 kHz in the particular implementation described.

The actual FO compensation is performed in a complex multiplier 70 comprising a first multiplier 72 that multiplies the Q demodulator output (after a 2T delay) by the $\sin(\theta)$ output of the lookup table 68, a second multiplier 74 that multiplies the I demodulator output (after a 2T delay) by the $\cos(\theta)$ lookup table output, and an adder 76 that adds the results of both multiplications to produce a compensated Q output in the form $$\sin[(\omega_{err} + \omega_{corr})T + \Delta\phi)t)]$$

The 2T delays balance the delays introduced by adder 60 and 62. With a proper selection of offset correction signals stored in the lookup table 68, the result of the complex multiplication is a "derotated" Q output, in which $\omega_{corr}$ is equal and opposite to $\omega_{err}$. All of the modulation information can be obtained from this FO-compensated Q output in the downstream circuitry.

Figure 4:
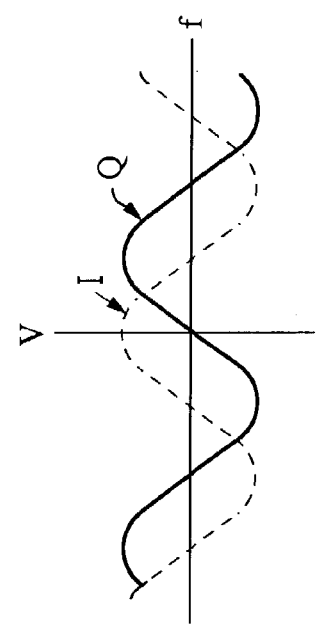
FIG. 4 is a graph of the I and Q signal components produced by the differential demodulator of FIG. 2, for zero FO.

FIG. 4 illustrates the voltage outputs of adders 60 and 62 as a function of frequency, centered on the baseband frequency. In the ideal case illustrated, with zero FO, the Q component is zero at baseband, while the I component is at a maximum. As illustrated in FIG. 5, which has an expanded scale relative to FIG. 4, the Q component is approximately linear near the origin. The situation in the presence of a non-zero FO is illustrated in FIG. 6. The FO produces a shift in the Q voltage curve, resulting in a DC offset equal to the voltage at the point where the Q curve intersects the baseband frequency axis; this DC offset corresponds to FOQ. Similarly, the I curve of FIG. 4 will be shifted by an FO so that it is no longer at a maximum at baseband frequency. The ratio of the new I component at baseband to its maximum value (normalized to the same scale as FOQ) corresponds to FOI. For small FOs, FOQ will be approximately directly proportional to the DC voltage offset because of the near-linearity of the Q curve in the vicinity of the origin. For larger FOs, however, the nonlinearity of the Q curve disrupts the proportionality between the DC offset and FO. The employment of the $\tan^{-1}$ (FOQ/FOI) function in the lookup table 68 yields a more accurate estimate of the FO, since FOI also varies in a nonlinear manner at frequencies that are not within the near-linear range of the I curve in the baseband region. The Q component gives the sign for the FO (positive or negative).

A typical DFSK data packet that can be used to modulate the carrier is illustrated in FIG. 7a. The packet typically has 625 bits, corresponding to a 625 μs data length. In reality the effective Bluetooth wireless technology packet length is 366 μs, with the rest of the packet dead time. The packet includes a 72 bit access code 78, a 54 bit header 80, with the remainder occupied by payload 82.

The access code 78 is illustrated in FIG. 7b. It consists of an initial 4-bit preamble 84, a 64-bit sync word 86 and an optional 4-bit trailer 88. The bit sequence of the preamble is 1010 or 0101, depending upon whether the first bit of the sync header is 1 or 0. In either case, the preamble will consist of alternating ones and zeros.

As mentioned previously, two preamble bits are accumulated in adders 60 and 62 (FIG. 3). This is illustrated in FIG. 8, in which four preamble bits output by the differential demodulator 32 are shown relative to the ADC mid-scale value. The ADC mid-scale value in turn is a function of the FSK modulation frequencies for the preamble and the rest of the data packet. Specifically, the "ones" 90 and "zeros" 92 of the bitstream correspond to the two FSK modulation frequencies. The ADC mid-scale reference value corresponds to an intermediate frequency half-way between the FSK frequencies. With zero FO, the ones 90 and zeros 92 will extend above and below the midscale value by equal amounts. In the presence of a non-zero FO, however, the DC values of the successive bits will no longer be centered on ADC mid-scale, with the amount of the DC offset varying with the size of the FO. The adders 60 and 62 in this illustration arithmetically accumulate the values of ten successive preamble samples at a sample rate of five per bit. This is illustrated in FIG. 8 by five samples 94 during a 1 bit 90, and five samples 96 during a 0 bit 92.

With zero FO and the bits balanced about ADC midscale, the sample values over the ten sample period will accumulate to zero. For non-zero FOs, on the other hand, the samples will accumulate to a non-zero value corresponding to FOQ. The production of FOI by adder 62 and comparator 66 is similar, except FOI will have a maximum value for zero FO, and a zero value for a 90° FO.

The phase compensation produced by complex multiplier 70 in response to the $\sin \theta$ and $\cos \theta$ operators from lookup table 68 is illustrated in FIG. 9. A demodulated signal with zero FO is represented by vector 98, while a demodulated signal whose phase has been rotated from 98 by an amount equal to $\omega_{err}T$ is represented by vector 100. A vector 102 which represents the phase change ($\Delta\phi(t)T$) of the demodulated signal over one symbol period T is also shown for reference. The corrective phase rotation produced by the arrangement of FIG. 3 adds a $-\omega_{err}T$ term to the signal which compensates for the FO, with the overall accuracy of the compensation for different FOs varying with the resolution of lookup table 68. The $\tan^{-1}$ function stored in lookup table 68 could be replaced with a real-time generation of that function for increased resolution, but this would add to the required computing power and take additional time.

While particular embodiments of the invention have been shown and described, numerous variations and alternate embodiments will occur to those skilled in the art. Accordingly, it is intended that the invention be limited only in terms of the appended claims.

We claim:

1. A frequency offset compensated receiver for an RE signal, said RE signal comprising a modulation with in-phase (I) and quadrature (Q) components on a carrier signal, said carrier signal having a carrier frequency, said receiver comprising:
a local oscillator (LO) which provides an LO signal at an LO frequency that is subject to offsets from said carrier frequency,
an extraction circuit connected to derive a demodulated signal from said RE signal based upon said LO signal, and
a frequency offset (FO) compensation circuit connected to adjust the phase of said derived demodulated signal to compensate for offsets, between said carrier and LO frequencies,
said FO compensation circuit including an FO determination circuit connected to determine the offset between said carrier and LO frequencies,
wherein said extraction circuit outputs I and Q components of said demodulated signal, and said FO determination circuit produces signals FOI and FOQ which correspond to the FOs associated with said I and Q components, respectively, and adjusts said I and Q components based upon FOI and FOQ.

2. The receiver of claim 1, said extraction circuit comprising a mixer connected to cooperate with said LO to downconvert said RF signal to an intermediate frequency (IF) signal, a quadrature downconverter connected to downconvert said IF signal to baseband, and a differential demodulator connected to demodulate said baseband signal.

3. The receiver of claim 2, wherein said mixer and LO operate in the analog regime and said quadrature downconverter and differential demodulator operate in the digital regime, further comprising an analog-to-digital converter connected to convert said IF signal to a digital format prior to said quadrature downconverter.

4. The receiver of claim 1, for a modulation which includes a data packet having a preamble with a known frequency characteristic, wherein said FO determination circuit determines said FO by comparing said derived demodulated signal to a reference signal level which is based upon said characteristic.

5. The receiver of claim 4, for a frequency shift key (FSK) modulation having a preamble which alternates between two different modulation frequencies, wherein said FO determination circuit determines said FO by comparing said derived demodulated signal for both of said preamble modulation frequencies with a reference signal level which corresponds to an intermediate frequency between nominal values of said modulation frequencies.

6. The receiver of claim 5, wherein said FO determination circuit is configured to accumulate equal multiple numbers of samples of said derived demodulated signal over each of said modulation frequencies, and to produce an output which varies with the difference between said reference signal level and the average value of said samples.

7. The receiver of claim 4, wherein said FO compensation circuit adjusts the phase of said entire data packet based upon said preamble.

8. The receiver of claim 1, wherein said FO determination circuit outputs a signal that varies with said FO.

9. The receiver of claim 8, wherein said FO compensation circuit provides phase rotation operators which correspond to different values of said FO determination circuit output signal, and adjusts the phase of said derived demodulated signal by applying to said derived demodulated signal phase rotation operators which correspond to the FO determination circuit output signal.

10. The receiver of claim 9, wherein said phase rotation operators are stored in a lookup table that is accessed by said FO determination circuit output signal.

11. The receiver of claim 1, wherein said FO compensation circuit provides phase rotation operators for said I and Q components in the form of $\sin(\theta)$ and $\cos(\theta)$, respectively, where $\theta = \tan^{-1}(FOQ/FOI)$.

12. The receiver of claim 11, wherein said phase rotation operators are stored in a lookup table in said FO compensation circuit.

13. The receiver of claim 11, said FO compensation circuit further comprising a complex multiplier connected to multiply said I and Q components by $\sin(\theta)$ and $\cos(\theta)$, respectively, and to combine the results to yield an FO compensated output signal.

14. The receiver of claim 1, wherein said FO compensation circuit outputs the Q component of an FO compensated demodulated signal, further comprising recovery circuitry that operates upon said Q component to recover the modulation.

15. A frequency offset (FO) compensation circuit for compensating frequency offsets between a carrier signal which carries a modulation signal, and a local oscillator (LO) signal used to downconvert the modulation signal, for a demodulated signal derived from said modulated carrier signal and having in-phase (I) and quadrature (Q) components, comprising:
an FO determination circuit connected to determine the offset between said carrier and LO frequencies, and
a compensation circuit connected to adjust the phase of said demodulated signal to compensate for the offset as determined by said FO determination circuit,
wherein said FO determination circuit produces signals FOI and FOQ which correspond to the FOs associated with said I and Q components, respectively, and adjusts said I and Q components based upon FOI and FOQ.

16. The FO compensation circuit of claim 15, wherein said FO determination and compensation circuits are digital.

17. The FO compensation circuit of claim 15, for a derived demodulated signal which includes a data packet having a preamble with a known frequency characteristic, wherein said FO determination circuit determines said FO by comparing said derived demodulated signal to a reference signal level which is based upon said characteristic.

18. The FO compensation circuit of claim 17, for a frequency shift key (FSK) modulation having a preamble which alternates between two different modulation frequencies, wherein said FO determination circuit determines said FO by comparing said derived demodulated signal for both of said preamble modulation frequencies with a reference signal level which corresponds to an intermediate frequency between said modulation frequencies.

19. The FO compensation circuit of claim 18, wherein said FO determination circuit is configured to accumulate equal multiple numbers of samples of said derived demodulated signal over each of said modulation frequencies, and to produce an output which varies with the difference between said reference signal level and the average value of said samples.

20. The FO compensation circuit of claim 19, wherein said FO compensation circuit adjusts the phase of said entire data packet based upon said preamble.

21. The FO compensation circuit of claim 15, wherein said FO determination circuit outputs a signal that varies with said FO, and said FO compensation circuit provides phase rotation operators which correspond to said FO determination circuit output signal and adjusts the phase of said derived demodulated signal by applying said phase rotation operators thereto.

22. The FO compensation circuit of claim 21, wherein said phase rotation operators are stored in a lookup table that is accessed by said FO determination circuit output signal.

23. The FO compensation circuit of claim 15, wherein said FO compensation circuit provides phase rotation operators for said I and Q components in the form of $\sin(\theta)$ and $\cos(\theta)$, respectively, where $\theta=\tan^{-1}(FOQ/FOI)$.

24. The FO compensation circuit of claim 23, wherein said phase rotation operators, are stored in a lookup table in said FO compensation circuit.

25. The FO compensation circuit of claim 23, said FO compensation circuit further comprising a complex multiplier connected to multiply said I and Q components by $\sin(\theta)$ and $\cos(\theta)$, respectively, and to combine the results to yield an FO compensated output signal.

26. A method of compensating for a frequency offset (FO) between a modulated carrier signal and a local oscillator (LO) signal used to downconvert the modulation signal, comprising:
 deriving a demodulated signal which includes a data packet having a preamble with a known frequency characteristic from said carrier signal, and
 adjusting the phase of said demodulated signal to compensate for said FO,
 wherein said phase adjustment step includes determining said FO; said FO determination step comprises providing a reference signal based upon said characteristic, and comparing said demodulated signal to said reference signal; the phase of the entire data packet is adjusted based upon said preamble; and said demodulated signal includes in-phase (I) and quadrature (Q) components, signals FOI and FOQ are produced in response to said FO determination which correspond to the FOs associated with said I and Q components, respectively, and the phase of said demodulated signal is adjusted based upon FOI and FOQ.

27. The method of claim 26, wherein said carrier signal is downconverted to baseband prior to adjusting the phase of said demodulated signal.

28. The method of claim 26, for a frequency shift key (FSK) demodulated signal having a preamble which alternates between two different modulation frequencies, wherein said demodulated signal comprises signal levels which correspond to said modulation frequencies, and said FO is determined by comparing said demodulated signal levels for both of said preamble modulation frequencies with a reference signal level which corresponds to an intermediate frequency between said modulation frequencies.

29. The method of claim 28, wherein average values of said demodulated signal levels are compared with said reference signal level to determine said FO.

30. The method of claim 26, wherein the phase of said demodulated signal is adjusted by applying phase rotation operators which vary with the determined FO to said signal.

31. The method of claim 26, wherein the phase of said demodulated signal is adjusted by multiplying said I and Q components by $\sin(\theta)$ and $\cos(\theta)$, respectively, where $\theta=\tan^{-1}(FOQ/FOI)$.

32. The method of claim 26, further comprising operating upon a Q component of said phase adjusted demodulated signal to recover the modulation.

33. A method of compensating a frequency offset (FO) between a carrier signal which bears a modulation signal, and a local oscillator (LO) signal used to downconvert the carrier signal, comprising:
 demodulating said carrier signal to derive a demodulated signal,
 determining said FO, and
 adjusting the phase of said demodulated signal to compensate for said FO,
 wherein said demodulated signal includes inphase (I) and quadrature (Q) components, said phase adjustment is performed by operating upon said I and Q components with different phase adjustment operators, FOs FOI and FOQ are determined corresponding to the FOs associated with said I and Q components, respectively, and the phase of said demodulated signal is adjusted based upon FOI and FOQ.

34. The method of claim 33, wherein said phase adjustment is performed after downconverting said carrier signal.

35. The method of claim 33, wherein said phase adjustment is performed after converting said downconverted signal from an analog to a digital format.

36. The method of claim 33, wherein the phase of said demodulated signal is adjusted by multiplying said I and Q components by $\sin(\theta)$ and $\cos(\theta)$, respectively, where $\theta=\tan^{-1}(FOQ/FOI)$.

37. The method of claim 33, further comprising operating upon a Q component of said phase adjusted demodulated signal to recover the modulation.

* * * * *